United States Patent
Lichtman et al.

[11] 3,729,992
[45] May 1, 1973

[54] TIRE-TESTING DEVICE

[75] Inventors: Jerome Lichtman, Commack; Joseph Salvi, Bayville, both of N.Y.

[73] Assignee: Stanford Technology Corp., Woodside, N.Y.

[22] Filed: June 16, 1971

[21] Appl. No.: 153,635

[52] U.S. Cl. .................................................73/146
[51] Int. Cl. ...........................................G01m 17/02
[58] Field of Search.........................................73/146

[56] References Cited

UNITED STATES PATENTS 3,060,734   10/1962   Obarski et al. ..........................73/146
3,206,973   9/1965   Obasski ...................................73/146

*Primary Examiner*—Donald O. Woodiel
*Attorney*—Jerome Bauer et al.

[57] ABSTRACT

A tire-testing device in which a test tire is powered in rotation by a road wheel while the tire is held by an appropriately directed force against the road wheel. The holding force is also used advantageously to confine the opposite ends of a strain gauge against movement while permitting the medial portion thereof to deflect in response to operating characteristic movements caused during the testing rotation of the tire.

5 Claims, 7 Drawing Figures

Patented May 1, 1973
3,729,992
2 Sheets-Sheet 1
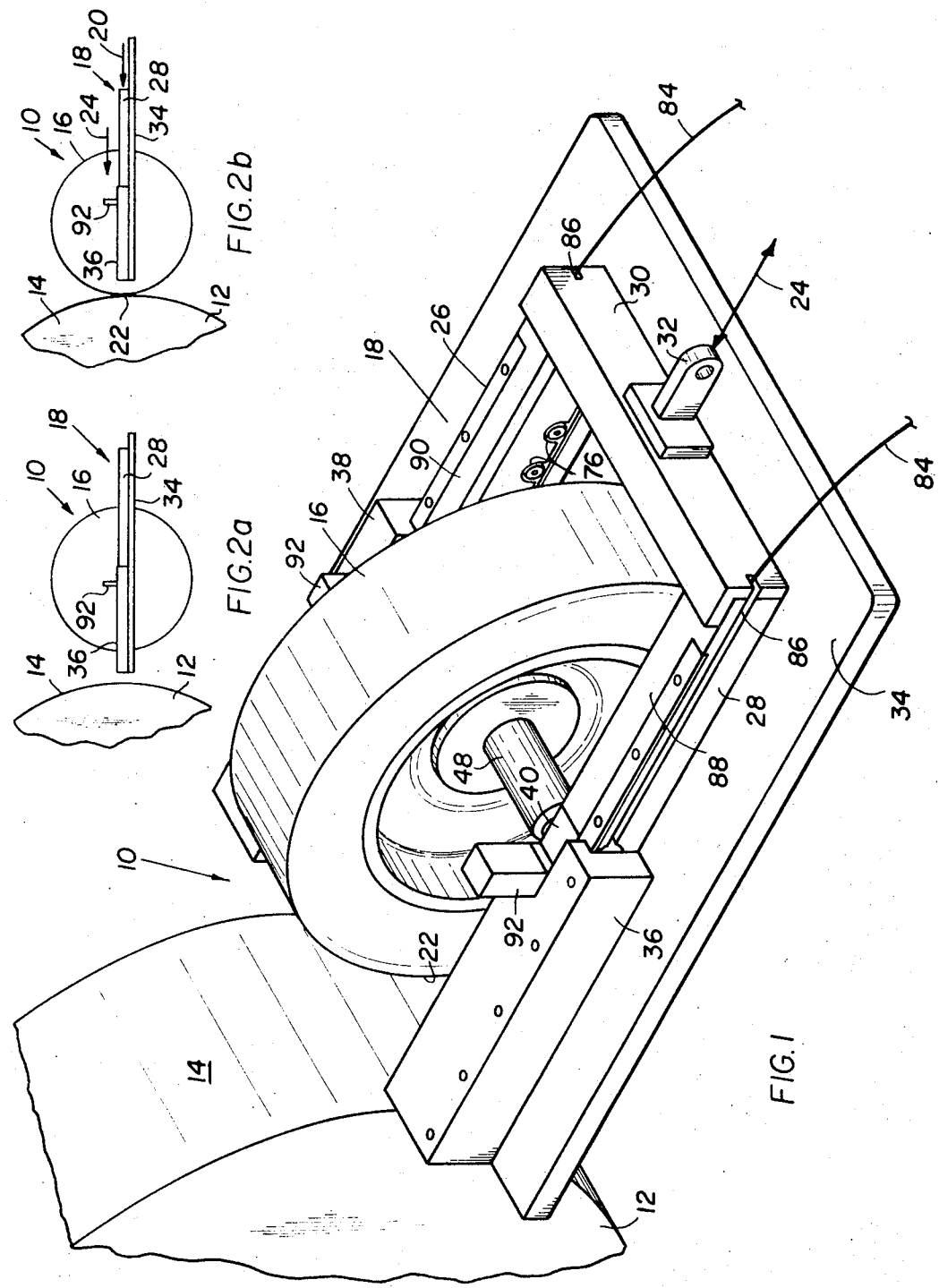
INVENTORS
JEROME LICHTMAN
JOSEPH SALVI
BY Bauer & Amer
ATTORNEYS Patented May 1, 1973

INVENTORS
JEROME LICHTMAN
JOSEPH SALVI

BY Bauer & Amer
ATTORNEYS

TIRE-TESTING DEVICE

The present invention relates generally to an improved tire-testing device, and more particularly to a device in which the test tire is readily mounted in test position against a driving road wheel such that the operating characteristics of the tire, as indicated by its slightest movements during such testing rotation, are detected by the device.

As a more convenient alternative to actual road testing of a tire to detect its operating characteristics and parameters, it is a known practice to utilize a tire-testing device in which the tire is powered in rotation by a driving road wheel. That is, the peripheral surface of the road wheel which actually contacts the tire is constructed with the properties of a typical road and is thus effective in measuring the performance of the tire with respect to such road surface. While the performance of such tire-testing devices are generally satisfactory, there is not one such device which is reliably sensitive to all operating characteristics of the tire, since often a movement of the tire, which is indicative of its performance, escapes detection by the device. Typically, a tire-testing device is generally massive so that sufficient pressure can be applied to hold the tire in test position. Yet, this massive size, as well as the remoteness of the movement-detecting instrumentation thereof from the tire, often dampens the movement sought to be detected, or otherwise adversely interferes with the detection of such movement.

Broadly, it is an object of the present invention to provide an improved tire-testing device overcoming the foregoing and other shortcomings of the prior art. Specifically, it is an object to provide a tire-testing device which is sensitive to a significant degree and extent to the slightest movement in the rotating axis of the test tire, and is thus capable of detecting abnormalities in the construction and mode of operation of the tire which heretofore could not be readily detected.

A tire-testing device demonstrating objects and advantages of the present invention includes the combination of a driving road wheel operatively arranged for tire-testing service and a tire-holding means for mounting the test tire in freewheeling relation and movable with said tire through a movement sequence preparatory to tire-testing service from a clearance position into an operative test position in which said tire is held against said road wheel and driven in rotation by said road wheel. A significant part of the tire-holding means is a strain gauge through which tire-holding pressure is applied during said movement sequence and during said tire-testing service and which gauge, nevertheless, is yieldable or capable of being deflected by forces applied in a reverse direction. It is these last named forces which effectively indicate operating characteristics of the tire during testing rotation thereof.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a tire-testing device according to the present invention;

FIGS. 2a and 2b are diagramatic side elevational views, on a reduced scale, illustrating the movement sequence of the test tire hereof, FIG. 2a illustrating the same in its clearance position and FIG. 2b in its operative test position.

Figures 3, 4, 5, 5A:
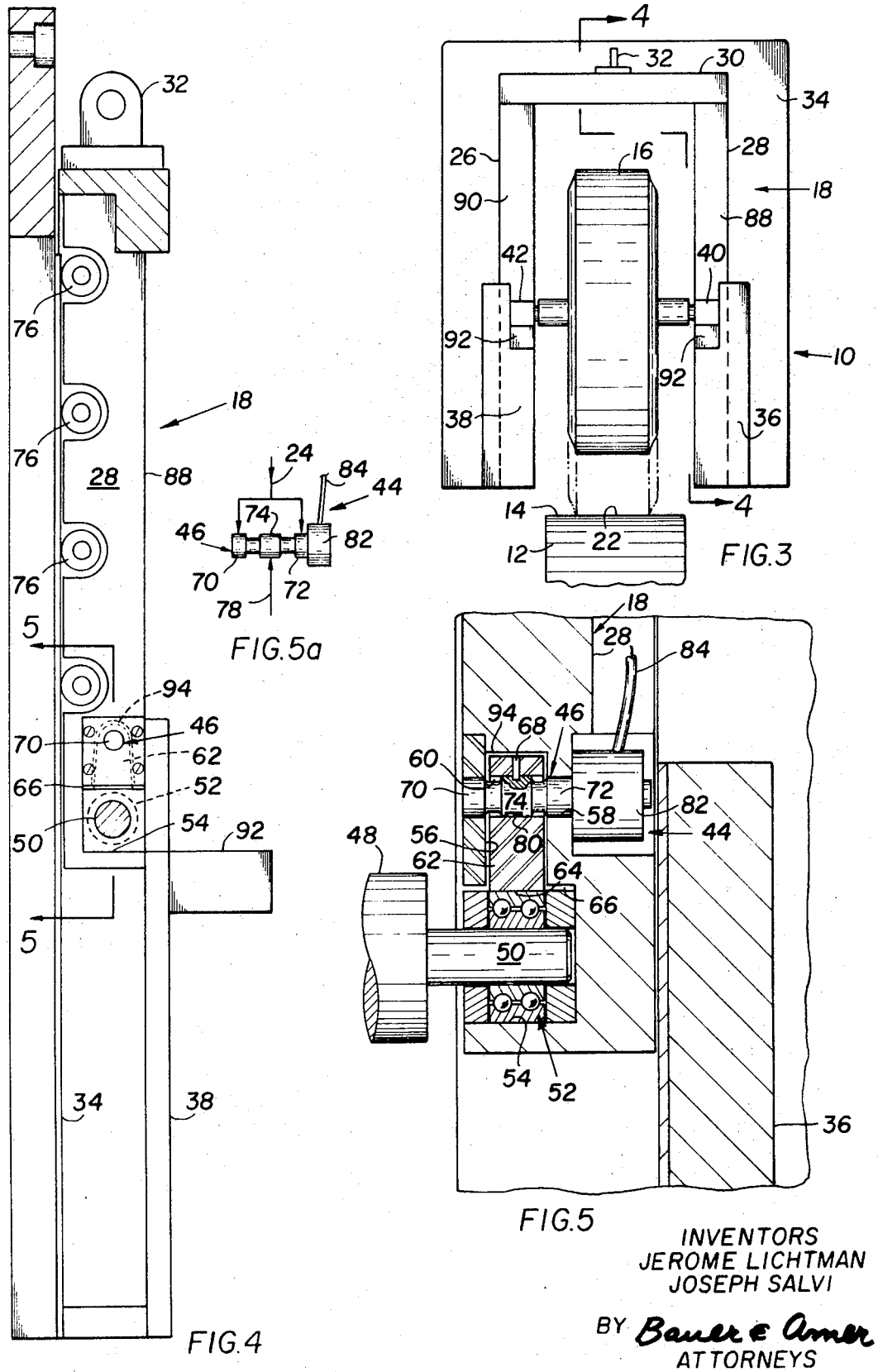
FIG. 3 is a plan view illustrating further structural details of the device hereof, wherein positions of movement of the test tire are illustrated in full line and phantom line perspective.
FIG. 4 is a side elevational view of the tire-testing device hereof, on an enlarged scale and in section taken on line 4—4 of FIG. 3, illustrating further structural details thereof.
FIG. 5 is an enlarged sectional view, taken on line 5—5 of FIG. 4, illustrating details of the strain gauge means hereof for determining operating characteristics of the tire during testing rotation thereof.
FIG. 5a is a diagramatic view related to FIG. 5 in that it illustrates the application of forces on said strain gauge means.

Reference is now made to the drawings, and in particular to FIGS. 1, 2a and 2b wherein there is shown a tire-testing device, generally designated 10, demonstrating objects and advantages of the present invention. Device 10 includes a driving wheel 12 which will be understood to be powered in rotation and to have a peripheral surface 14 constructed with the properties of a typical road and in facing relation to the tire 16 which is to be tested. That is, instead of actually road testing the tire 16, the tire is pressed against a simulated road surface 14 of the road wheel 12 which is then powered in rotation. Thus, during a typical interval of tire-testing service of the road wheel 12, it is possible to determine the operating characteristics of the tire 16.

By progressive examination of FIGS. 2a and 2b, it can be readily appreciated that typical tire-testing service of the device 10 contemplates the mounting of the tire 16 in a freewheeling relation in an actuating member, generally designated 18, which is moved from a clearance position, as illustrated in FIG. 2a, through a movement sequence 20 into an operative test position, as illustrated in FIG. 2b, in which the test tire 16 is held against the road wheel 12, as at 22, and thus driven or powered in rotation by the road wheel. Contact 22 is established under a select pressure or holding force 24 which is transmitted via the actuating member 18 and is actually maintained during a typical interval of tire-testing service of the device 10. A noteworthy aspect of the present invention, as will be described in detail subsequently, is the ability during the operation of device 10 to apply a holding force 24 in the direction illustrated while simultaneously having the device 10 sensitive to reverse direction forces 78 applied against the tire 16. It is such forces 78 which effectively indicates the operating characteristics of the tire 16 during testing rotation of the same, such as whether it is smooth-running, whether it wobbles, whether it is subject to excessive expansion of the pressure air within the tire, and other such factors.

The foregoing noteworthy mode of operation of the tire-testing device 10 hereof can best be appreciated by reference to FIG. 1 in conjunction with FIGS. 3–5a. Specifically, the previously noted actuating member 18, as illustrated in these figures, is preferably formed as a U-shaped member having bifurcated arms 26 and 28 formed into a rigid construction by a laterally oriented base 30. As shown, base 30 has a rearwardly extending lug 32 by which, it will be understood, an operative connection is made to an actuating link or crank arm of a crank shaft or similar powering mechanism. It is in this manner that the previously noted holding force 24 is transmitted to the actuating member 18 to be in turn transmitted to and utilized for establishing the area of contact 22 between the tire 16 and road wheel 12.

Mounted upon a flat base plate 34 are spaced-apart guides 36 and 38 which respectively slidably accommodate forward portions 40 and 42 of the arms 26, 28 of the actuating member 18.

As illustrated in FIG. 5, the operating characteristic movements of the test tire 16 are detected and measured by a strain gauge means, generally designated 44. Although means 44 includes a strain gauge 46 of known construction and which operates in a well understood manner to detect, indicate and measure applied forces, the incorporation of the strain gauge means 44 as a part of the actuating member forward portions 40 and 42 hereof provides noteworthy results which represent a patentable advance for tire-testing devices. One load-sensing stud which has been successfully used as a strain gauge 46 in accordance with the present invention is that which is commercially available from Strainsert Co. of Brynmawr, Pa.

Still referring to FIG. 5, it will be understood that this figure shows the internal construction of forward portion 42, and that forward portion 40 has the identical construction. Specifically, the test tire 16 is mounted on a mandrel or axle 48, which are journalled for rotation in roller bearings 52. These bearings 52 are accommodated in a bore 54 in the facing side walls of the actuating member arms 28 and 26. Thus, the test tire 16 is mounted in a freewheeling relation about an axis of rotation defined by the transversely oriented axle 48.

Appropriately machined in each actuating member forward portion 40, 42 is a comparatively large opening 56 which opens upon the cylindrical bore 54. At a location remote from bore 54, there is a transversely oriented through bore or opening 58 which actually accommodates the strain gauge 46 in a correspondingly transversely oriented position which is substantially parallel to the axis of rotation of the tire-mounting axle 48. The assembly of the gauge 46 in the operative position illustrated in FIG. 5 contemplates the projection of the same through a cylindrical opening 60 of a force-transmitting member 62 which is disposed within the opening 56 and has an edge 64 in pushing contact against the bearing 52. It is convenient at this point to note that member 62, as illustrated in FIG. 4, is generally rectangular in shape, and that it is sized so as to extend a distance 66 beyond the end of opening 56 and into the bore 54. In practice, it is preferable that the extension be five-thousanths of an inch. The significance of this will be appreciated subsequently.

The just described assembly of strain gauge 46 within the upper portion of the force-transmitting member 62 is maintained in any appropriate manner, as by a set screw or aligning pin 68. This operative position is one in which the enlarged diameter operative ends 70 and 72 of the strain gauge 46 are in contact with the surface which bounds the opening 58 in arm 28 of the actuating member 18. However, the medial portion or middle cylindrical configuration 74 of the strain gauge 46 is advantageously located in the length portion 60 of the opening 58. This thus positions portion 74 adjacent the surface of member 62 which bounds the opening 58. Accordingly, and as is perhaps best illustrated in FIG. 5a, the pushing force 24, which is exerted upon the actuating member 18 and is transmitted via said member to the tire 16, is actually applied to the strain gauge 46 at each of the end cylindrical portions 70 and 72.

In response to force 24, member 18, which actually mounts the test tire 16, is thus urged through the previously noted movement sequence 20, with the tire-mounting arms 26 and 28 thereof being mounted on rollers, individually and collectively designated 76, to permit this degree of rolling movement relative to the base plate 34. As a consequence, the test tire 16 is moved firmly against the road wheel 12 making driving contact as at 22. This relationship between the test tire 16 and road wheel 12 is maintained during the entire interval of tire-testing service of the road wheel 12.

Simultaneously with the aforesaid application of force 24, however, and also as again best shown in FIG. 5a, the middle cylindrical portion 74 of the strain gauge 46 is subject to forces 78 in the direction indicated which, in turn, are a function of the previously noted operating characteristic movements of the tire during testing rotation thereof. Specifically, forces 78, as may best be appreciated from FIG. 5, are applied against portion 74 of the strain gauge 46 by surface 89 of the force-transmitting member 62. In response to forces 78, there are corresponding deflections induced in the strain gauge 46 which are transmitted to appropriate instrumentation 82 forming an integral part of the conventional commercial embodiment 44 of the strain gauge means hereof. As generally understood, the aforesaid deflections in the body of the strain gauge 46 are converted into electrical impulses at 82 and transmitted via conductors 84, accommodated in transverse slots 86 in the arms 26, 28, to a remote location for study. At the remote location, the electrical impulses may advantageously be used to operate a stylus or other recording mechanism which facilitates measuring and analyzing the operating characteristic movements of the tire 16 produced during its testing.

To briefly summarize the operation of the tire-testing device 10, at an initial point preparatory to tire-testing service, it should be assumed that the actuating member 18 is in its starting or clearance position remote from the driving road wheel 12 and that the tire 16 has not yet been installed in its mounted position within the actuating member 18. To install the tire 16, which will be understood to be in its mounted position upon the mandrel or axle 48, it is necessary merely to roll the bearings 52, which are in their operative position on the ends of the axle hubs 50, along the top walls 88 and 90 of the side arms 28, 26 of the actuating member 18. When the bearings 52 clear the front or forward portions 40, 42 of the member 18, they strike upstanding stops 92 and drop into the bores 54 formed in each of the forward portions 40, 42.

A select amount of holding force 24 is then exerted on the slidably disposed actuating member 18 and, in response thereto, member 18 and the tire 16 mounted in freewheeling relation thereon is moved through its movement sequence 20 in the direction of the road wheel 12. This results in the establishment of contact 22 between the test tire 16 and the road surface 14 of the road wheel 12.

It is next contemplated that the road wheel 12 will be powered in rotation and, in turn, result in testing rotation of the test tire 16. In response to operating characteristic movements of the tire 16 during the aforesaid testing rotation thereof, reverse direction forces 78 will be exerted upon and transmitted by the force-transmitting member 62 against the medial portion of the strain gauge 46. This results in deflections in the medial portion 74 of the strain gauge 46 to the extent permitted by the clearance 94, which in a preferred embodiment is at least three-thousanths of an inch, which exists between the surface bounding the bottom of the opening 56 and the portion of the member 62 adjacent thereto. As already indicated, and as a result of the well understood operation of the strain gauge means 44, the aforesaid deflections in the medial portion 74 are converted into electrical pulses in the instrumentation portion 82 of the strain gauge means 44 and are readily transmitted via the conductors 84 to read-out or recording instrumentation.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A tire-testing device including a driving road wheel operatively arranged for tire-testing service, and a tire-holding means for mounting a tire to be tested in freewheeling relation and movable with said tire through a movement sequence preparatory to tire-testing service from a clearance position into an operative test position in which said tire is held against said road wheel and driven in rotation by said road wheel, said tire-holding means comprising an axle having said tire mounted for rotation thereon, an actuating member having forward portions thereon in pushing contact adjacent opposite ends of said axle, pressure-applying means operatively arranged to transmit a select tire-holding pressure through said actuating member against the axle of said tire, and a strain gauge fabricated of a comparatively rigid material, said strain gauge having an operative position oriented subsequently parallel to said axle of said tire and arranged so that said tire-holding pressure is transmitted through opposite ends thereof and said reverse direction forces are applied against said medial portion thereof, whereby said last named forces effectively indicate operating characteristics of said tire during testing rotation thereof.

2. In a tire-testing device in the operation of which a tire is powered in rotation about a rotation axis, an improved means for detecting movements in said rotation axis during said testing rotation of said tire including an axle mounting said tire in freewheeling rotation defining said rotation axis, and movement-detecting means adjacent an end of said axle comprising a slidably disposed member oriented perpendicularly of and in contact at one end with said axle so as to partake of sliding movement corresponding to axle movements transverse of said rotation axis, a strain gauge having a medial portion only projected through an opening in said slidably disposed member adjacent the end thereof remote from said axle and its opposite ends extending from opposite sides of said slidably disposed member, and holding means in engagement with said extending ends of said strain gauge so as to confine said ends against transverse movement during testing rotation of said tire, whereby only movements as are transmitted via said slidably disposed member to the medial portion of said strain gauge effect the operation of said strain gauge.

3. An improved tire-testing device as claimed in claim 2 including a driving road wheel operatively arranged to power said tire in rotation, and wherein a directional force is exerted on said holding means so as to cause said confinement against movement of the ends of said strain gauge and also to hold said tire driving contact against said driving road wheel.

4. An improved tire-testing device as claimed in claim 3 wherein said holding means includes a U-shaped actuating member having bifurcated arms, each said arm being in pushing contact adjacent one end of said axle.

5. A tire-testing device as claimed in claim 4 wherein each opposite end of said axle is accommodated in a bearing which is contacted by a cooperating forward portion of each arm of said actuating member.

* * * * *